(12) United States Patent
Sakayori et al.

(10) Patent No.: US 6,336,078 B1
(45) Date of Patent: Jan. 1, 2002

(54) QUALITY MANAGEMENT OF COMPONENTS

(75) Inventors: Masahiko Sakayori, Toride; Naoki Otsuji, Ryugasaki; Yutaka Inaba, Moriya-machi; Yasuteru Hongu, Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/160,090

(22) Filed: Sep. 25, 1998

(30) Foreign Application Priority Data

Sep. 30, 1997 (JP) ............................................. 9-267367
Sep. 30, 1997 (JP) ............................................. 9-267368

(51) Int. Cl.⁷ ............................................. G06F 17/30
(52) U.S. Cl. .................................... 702/81; 324/870.04
(58) Field of Search ............................. 702/81, 82, 83, 702/84, 182, 127, 108, 1; 711/200; 73/1.01; 324/130, 870.04, 870.05, 109; 700/32, 108, 95, 90, 28

(56) References Cited

U.S. PATENT DOCUMENTS

| | | | | |
|---|---|---|---|---|
| 3,946,212 A | * | 3/1976 | Nakao et al. | 235/151.13 |
| 4,697,245 A | * | 9/1987 | Kara et al. | 364/552 |
| 5,243,532 A | * | 9/1993 | Macchiarulo | 364/473 |
| 5,245,554 A | * | 9/1993 | Tsuyama et al. | 364/552 |
| 5,442,545 A | * | 8/1995 | Matsui et al. | 364/403 |
| 5,596,712 A | * | 1/1997 | Tsuyama et al. | 395/183.02 |
| 5,768,153 A | * | 6/1998 | Hosono et al. | 364/552 |
| 5,960,374 A | * | 9/1999 | Lausier | 702/81 |
| 5,961,557 A | * | 10/1999 | Morimoto et al. | 701/1 |
| 6,027,022 A | * | 2/2000 | Hong | 235/462.01 |
| 6,115,643 A | * | 9/2000 | Stine et al. | 700/110 |
| 6,122,600 A | * | 9/2000 | Brunelle | 702/123 |
| 6,141,647 A | * | 10/2000 | Meijer et al. | 705/1 |

FOREIGN PATENT DOCUMENTS

JP 09-006846 1/1997

* cited by examiner

Primary Examiner—Marc S. Hoff
Assistant Examiner—Edward Raymond
(74) Attorney, Agent, or Firm—Fitzpatrick, Cella, Harper & Scinto

(57) ABSTRACT

A method, system and program for managing quality information of components comprises by inputting and storing quality information of an ordered component, inputting quality information of a delivered component, checking the quality information of the delivered component, updating the stored quality information in accordance with a check result, and transmitting the updated quality information to a shop that uses the component. The component delivered to the shop is maintained in a matched relationship with associated quality information.

32 Claims, 16 Drawing Sheets

FIG. 6

(WITHOUT CHANGE OF SPECIFICATION)

PRODUCT "Body" (UNITS A, B, C, D)
(601)

UNIT D (PARTS a, b, c, d)
(602)

PART d
(603)

CHANGE TO d-1

(WITH CHANGE OF SPECIFICATION)

PRODUCT "Body-1" (UNITS A, B, C, D-1)
(601)

UNIT D-1 (PARTS a, b, c, d-1)
(602)

PART d-1
(603)

QUALITY MANAGEMENT OF COMPONENTS

BACKGROUND OF THE INVENTION

1. Field of the Invention

The present invention relates to a system and a method for quality management of a component, where the component may be either a single part or a unit made up of a plurality of parts.

2. Description of the Related Art

Conventional quality management of components will be described with reference to FIG. 10.

Terminals 133-1, 133-2, 133-3 are connected to a CPU (Central Processing Unit) 131. Storage means 132-1, 132-2, 132-3, 132-4 are also connected to the CPU 131.

As one example, information of components to be used is registered in and managed using data base 132. Model numbers, maker names and other data of components of a given product are managed as quality information. When a change in a component occurs due to a design change, past records of specification changes and so on are registered as quality information in the data base for management. The data registered in the data base is searched from the terminals 133-1, 133-2, 133-3, and operators can obtain required information. Results of production programs processed by the CPU 131 are outputted as order instructions to the terminals 133-1, 133-2, 133-3. A process flow from a production program to ordering will be described below with reference to FIG. 11.

Steps 1101 to 1108 indicate a process flow of conventional component ordering. Step 1101 manages the production program of a product. For example, the program is inputted by using the terminal 133-1 shown in FIG. 10. The program includes instructions specifying how many parts and units are to be manufactured and when they are to be manufactured.

In step 1102, classification of components used (development of components) is performed based on component data 1106. A data base 1104 manages working information (such as the number of days and the procedures required for working) necessary for the component development, and is referred to at the time of executing the component development. The number of required components calculated in step 1103 is compared with the number of stocked components registered in an inventory data base 1107 to calculate the number of components to be purchased and the delivery day of the components (order program 1109). Calculated results are outputted as component orders to be displayed at the terminal or printed on sheets (1108).

A flow of an "ordered substance" will now be described with reference to FIG. 12. Assume that a product "Body" is ordered. The "Body" comprises four units "A", "B", "C" and "D", and the unit "D" is made up of four parts "a", "b", "c" and "d". The model number, maker name, etc. for each of the parts provide quality information, and data of the entire product ("Body") is managed with the quality information of the included part levels linked in the form of a string.

For example, in the case of manufacturing the product "Body" in a quantity of 1000, if any component (unit or part) is changed during the course of production, the quality information may no longer match the product that is actually produced. Assuming that a given component is changed at the 499-th "Body", it may be difficult to identify the 499-th "Body" in the field of production in many cases. When a component is assembled through a plurality of work units (called shops hereinafter), it can be even more difficult to identify the affected component because of intermediate preparation and transportation between the shops.

Consider the case where the part "d" is replaced by "d-1" in the part d manufacturing shop 1203. The two parts have the same rated specification, and are both supplied to the unit D manufacturing shop 1202. The unit D (made up of the parts a, b, c and d) and the unit D-1 (made up of the parts a, b, c and d-1) have the same function, but will have different quality information. It is therefore essential to manage the quality information in matched relation to the products that are actually produced, which will be referred to herein as information/substance matching.

However, where the changed part is transferred through different shops, e.g., the part manufacturing shop 1203 to the unit manufacturing shop 1202 to the "Body" assembling shop 1201, as shown in FIG. 12, performing information/substance matching (i.e., managing the pre-change quality information and the post-change quality information in matched relation with any given unit or body) is difficult in many cases.

If a working process is limited to one shop, component management including component collation can be performed by the conventional system (FIG. 10). It is however difficult for a system to maintain information and substance in matched relation through a plurality of shops.

More specifically, shops provided with the terminals 133-1, 133-2, 133-3, as shown in FIG. 10, can refer to information in the data base 132, because of the connection through the CPU 131. However, in a conventional system, the information in the data base is maintained on the basis of the ordering time. Where a given substance is transferred (delivered) between shops, therefore, it is difficult to update quality information subsequent to the transfer of the substance, since there is no uniquely determined relationship between a given substance delivered from one shop to another and the data base information maintained on the basis of the ordering time.

One of the reasons why there is no uniquely determined relationship between information and substance is the presence of variations in production lead time due to changes of shop loads, intermediate preparations, and transportation between the shops.

Apart from matching information and substance as described above, it is also often important for a person engaged in information management to know the position of a given substance and information regarding that substance at an appropriate point in time. For example, in the case of carrying out a quality inspection of the part "d-1" that has been substituted for the part "d" due to a design change, or in the case of carrying out a performance test of the unit "D-1" using the part "d-1", persons engaged in departments of design, quality management, etc. may need to know about the arrival of the changed substance at an appropriate point in time. Conventionally, those persons would only become aware of the arrival of the changed substance upon receiving a notice from the part receiving department or by searching a data base to determine whether the changed substance has been delivered.

Thus quality management of components according to the related art has had the problems below. Because component information was conventionally maintained on the basis of the ordering time, when any component used in a design was changed, component information at the ordering time could not be correctly correlated to component information of the changed component at delivery time if the changed component was transferred through different working areas. It has therefore been difficult to manage information and substance in matched relation. Also, in connection with quality inspections and performance tests of delivered components, it was not easy to determine when the substance subjected to the design change would arrive, and the arrival of the objective substance has been mainly left up to persons from the component receiving department in the production site. Accordingly, it was easy to miss a required inspection or test.

SUMMARY OF THE INVENTION

A primary object of the present invention is to solve the problems mentioned above.

To achieve the above object, according to one aspect of the present invention, there is provided a system for managing quality information of a component. The system includes: (a) first input means for inputting quality information of an ordered component; (b) storage means for storing the quality information of the ordered component; (c) second input means for inputting quality information of a delivered component; (d) check means for checking the quality information of the delivered component by checking data maintained in a matched relationship with the delivered component; (e) update means for updating the quality information loaded in the storage means with the quality information of the delivered component in accordance with a check result from the check means; and (f) transmission means for transmitting the updated quality information to a terminal provided in a shop using the component.

According to another aspect of the present invention, there is provided a method for managing quality information of a component. The method includes the steps of: (a) inputting quality information of an ordered component; (b) storing the quality information of the ordered component; (c) inputting quality information of a delivered component; (d) checking the inputted quality information of the delivered component by checking data maintained in a matched relationship with the delivered component; (e) updating the quality information stored in the storing step with the quality information of the delivered component in accordance with a result of the checking result; and (f) transmitting the updated quality information to a terminal provided in a shop using the component.

According to still another aspect of the present invention, there is provided a storage medium upon which computer executable process steps for managing quality information of a component are stored. The stored steps include: (a) storing quality information of an ordered component in storage means; (b) inputting quality information of a delivered component; (c) checking the inputted quality information of the delivered component by checking data maintained in a matched relationship with the delivered component; (d) updating the quality information stored in the storage means in accordance with a result of the checking step; and (e) transmitting the updated quality information to a terminal provided in a shop using the component.

According to still another aspect of the present invention, there is provided a system for managing quality information of a component. The system includes: (a) first input means for inputting quality information of an ordered component; (b) storage means for storing the quality information of the ordered component; (c) second input means for inputting quality information of a delivered component; (d) check means for checking the quality information of the delivered component by checking data maintained in a matched relationship with the delivered component; and (e) inform means for informing delivery of the component in response to an input of the quality information made by the second input means.

According to still another aspect of the present invention, there is provided a method for managing quality information of a component. The method includes the steps of: (a) storing quality information of an ordered component; (b) inputting quality information of a delivered component; (c) checking the inputted quality information of the delivered component by checking data maintained in a matched relationship with the delivered component; and (d) informing delivery of the component in response to an input of the quality information of the delivered component.

According to still another aspect of the present invention, there is provided a storage medium upon which computer executable process steps for managing quality information of a component are stored. The stored steps include: (a) storing quality information of an ordered component in storage means; (b) inputting quality information of a delivered component; (c) checking the inputted quality information of the delivered component by checking data maintained in a matched relationship with the delivered component; and (d) informing delivery of the component in response to an input of the quality information of the delivered component.

Other objects and features of the present invention will be apparent from the following detailed description and the attached drawings.

BRIEF DESCRIPTION OF THE DRAWINGS

FIG. 6 is a representation shown an example of quality information.

DETAILED DESCRIPTION OF THE PREFERRED EMBODIMENT

Figure 2:
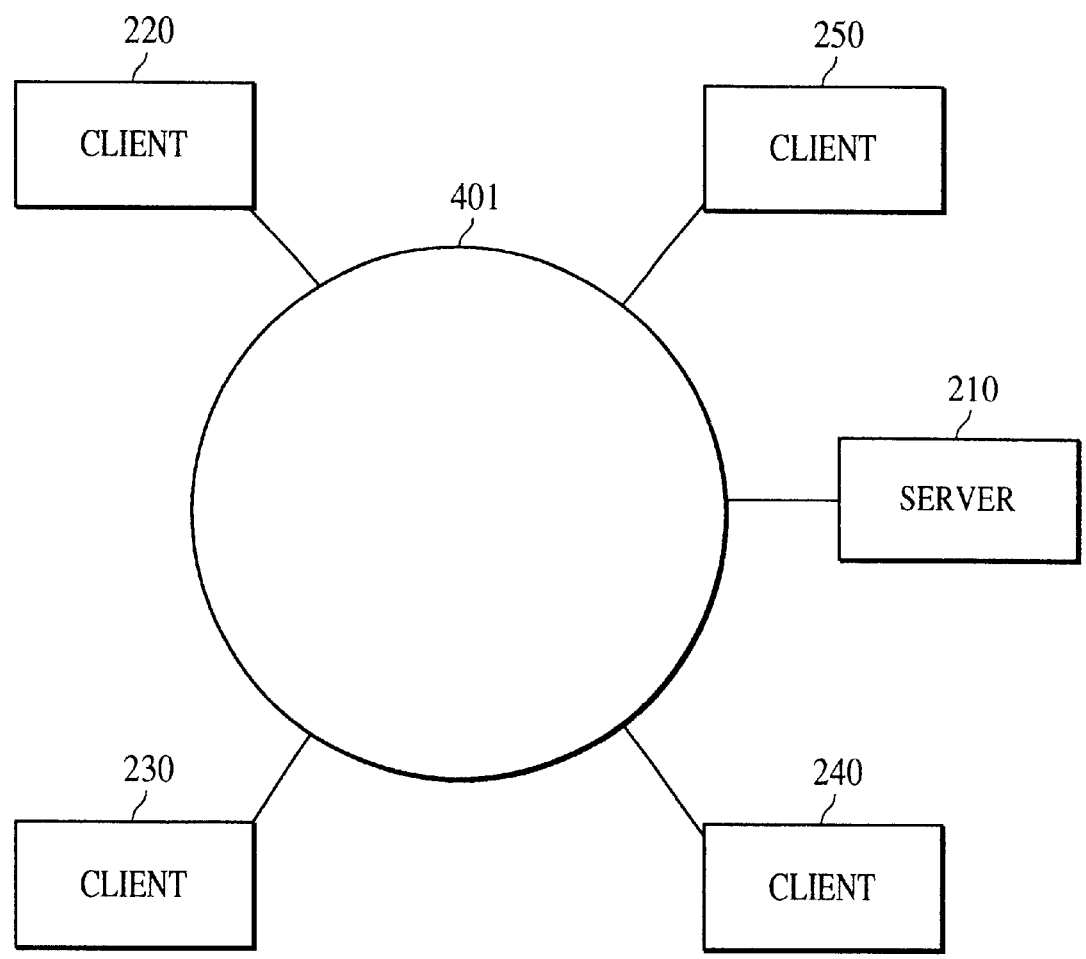
FIG. 2 is a block diagram showing a client server system.
Figure 3:
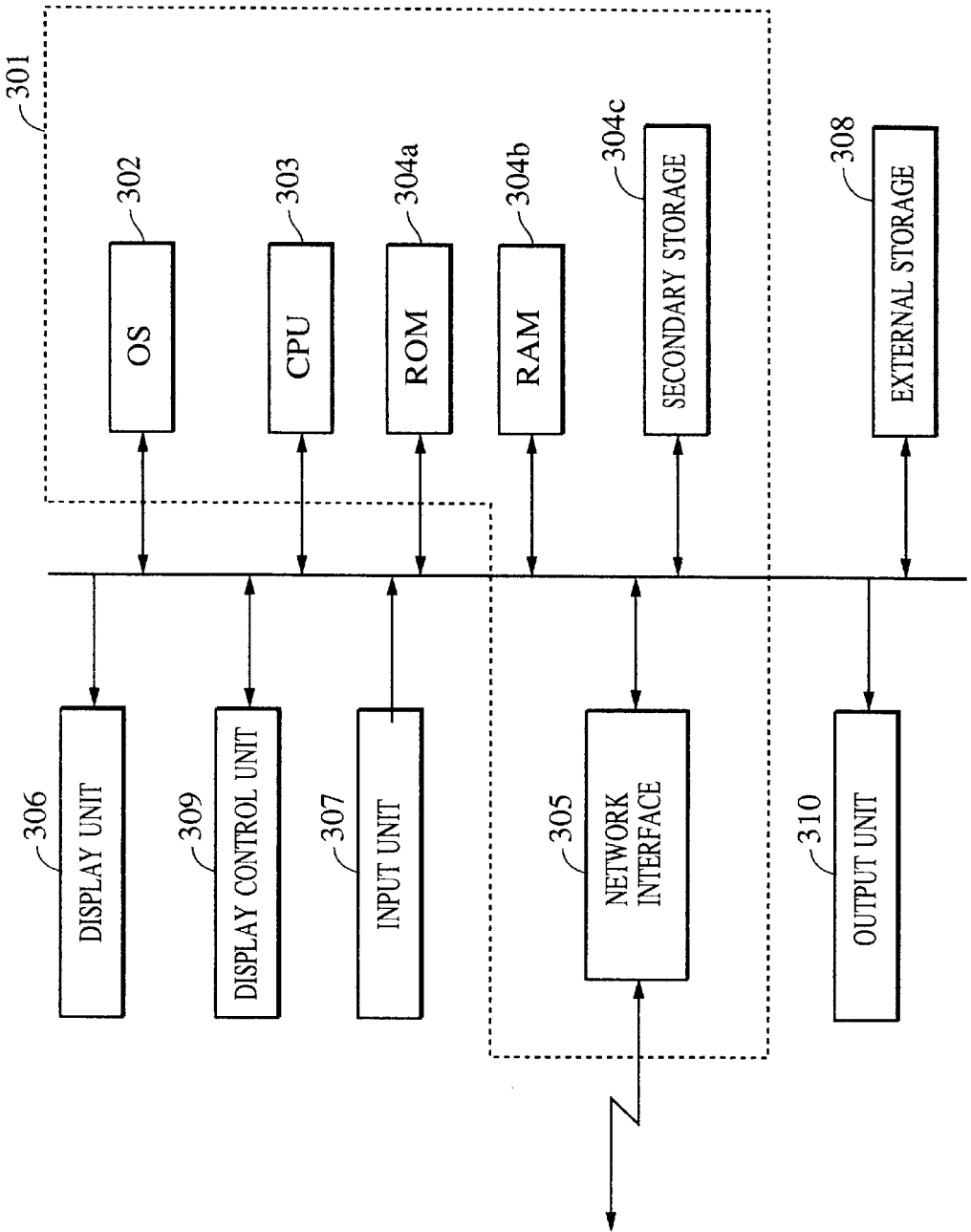
FIG. 3 is a block diagram showing a configuration of a computer system.

FIG. 2 shows a component management system in accordance with the present invention with a hardware configuration comprising clients 220, 230, 240, 250 and a server 210. Each of the clients and the server may be implemented as a computer 301 having a standard configuration comprising, as shown in FIG. 3, an operating system (OS) 302, a CPU 303, a ROM 304a, a RAM 304b, a secondary storage 304c, and a network interface 305. Connected to the computer 301 are a display unit 306, a display control unit 309, an input unit 307, an external storage 308, and an output unit 310.

The input unit 307 may include various types of input units through which data is entered with respect to an image on a display screen, or input units which read information in the form of a bar code. Specifically, the input unit 307 may comprise one or more of a mouse, track ball, touch pen, joy stick, tablet, keyboard and/or bar code reader.

The display unit 306 displays, on a display screen, data (such as characters, figures and numerals) transferred between the various computers. The display unit 306 may be any suitable type including a CRT display, a liquid crystal display, a plasma display and so on. The display control unit 309 processes the data to display quality information in the form of a graph or table for all components or a particular component, which has undergone a change in specification, on the display unit 306.

The output unit 310 prints, for example, on paper, data, processing results, and contents indicated on the display unit 306. The output unit 310 may be any suitable type including a laser printer, an ink jet printer, and the like.

Figure 4:
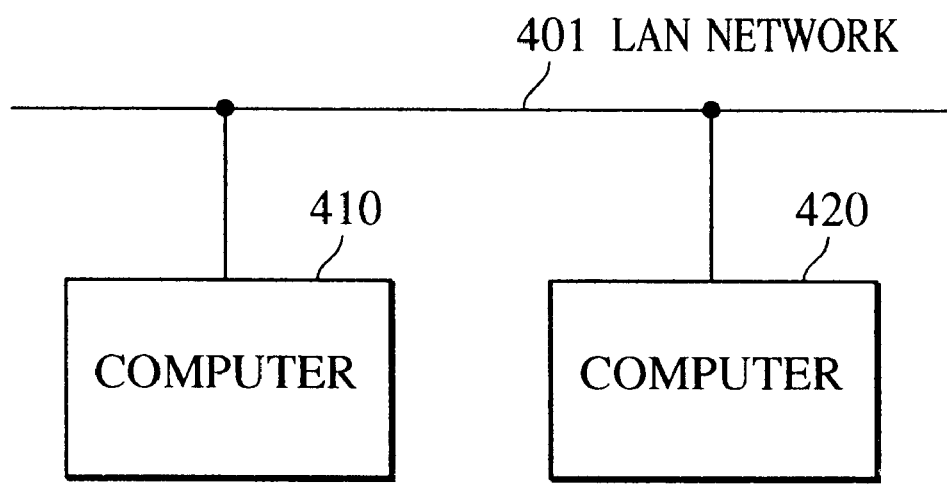
FIG. 4 is a block diagram showing a basic configuration of a network using the system of the present invention.

Further, as shown in FIG. 4, computers 410, 420 (each being equivalent to the computer 301 shown in FIG. 3) are connected to a LAN network 401 so that data can be transmitted and received between the computers. Data is transmitted and received through the network interface 305 (FIG. 3).

Figure 11:
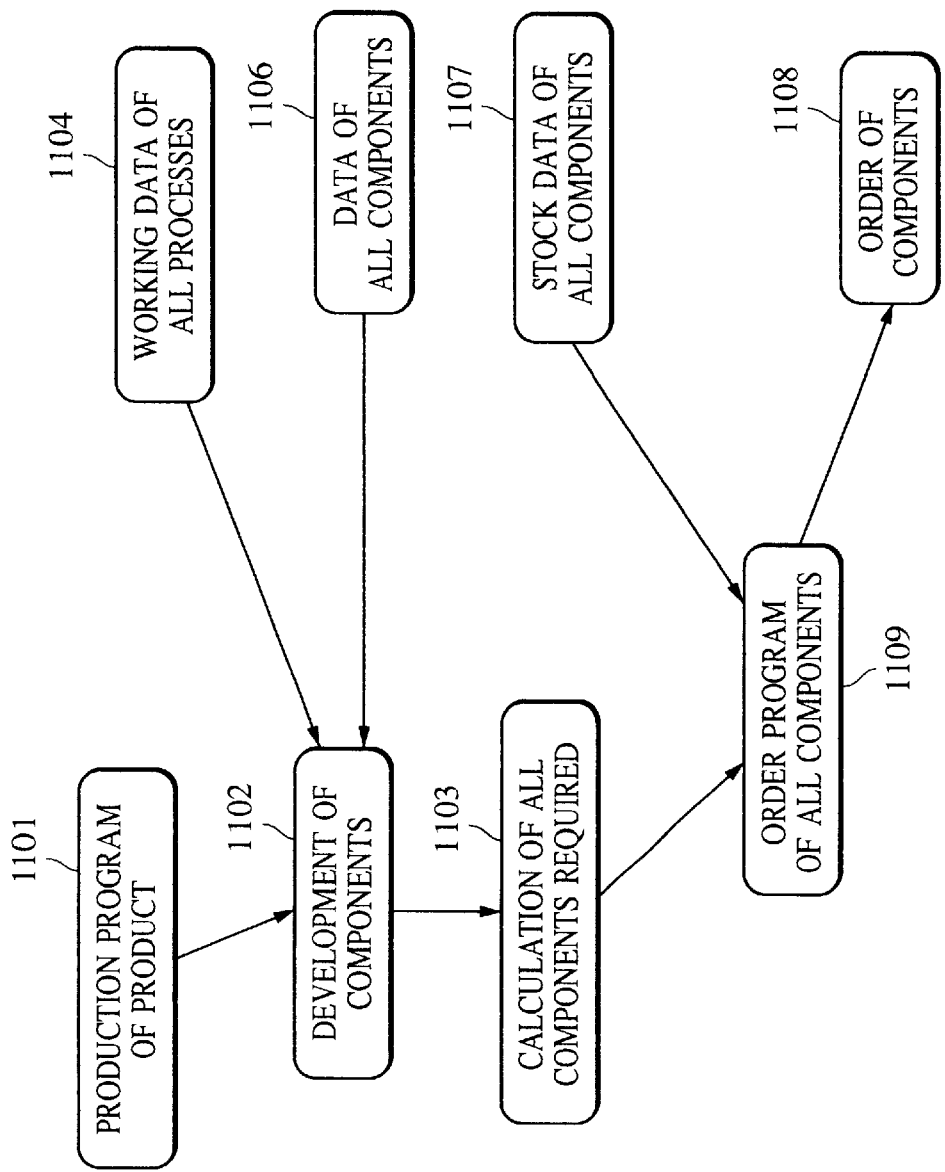
FIG. 11 is a flowchart showing a process from a production program to ordering of the related art.
Figure 12:
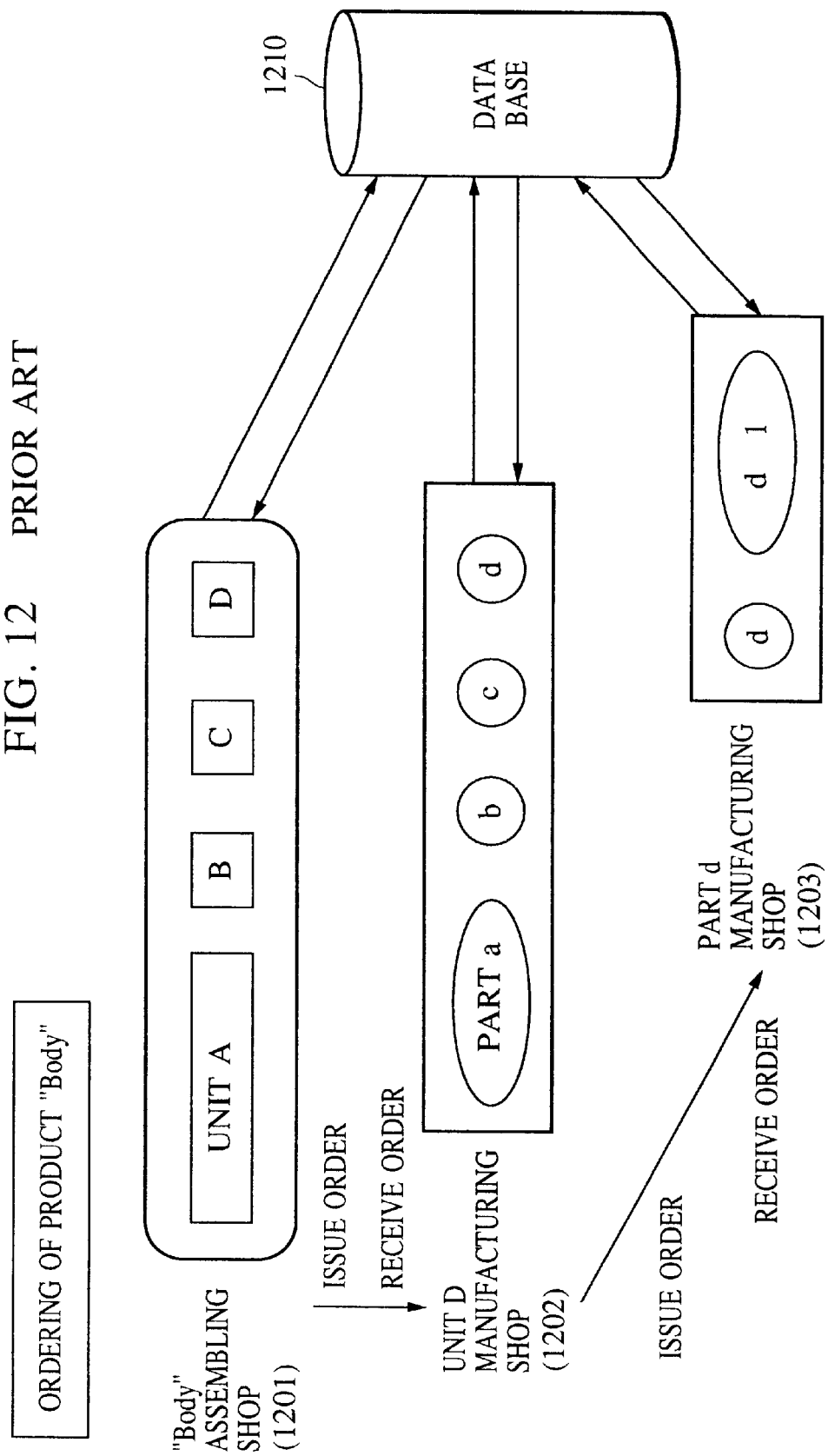
FIG. 12 is a block diagram showing the correlation between ordering of a component and receiving an order in the related art.

The process shown in FIG. 11 from a production program to the ordering of a component is executed by the server 210 shown in FIG. 2, and instructions are issued to the clients 220, 230, 240, 250.

Figure 1:
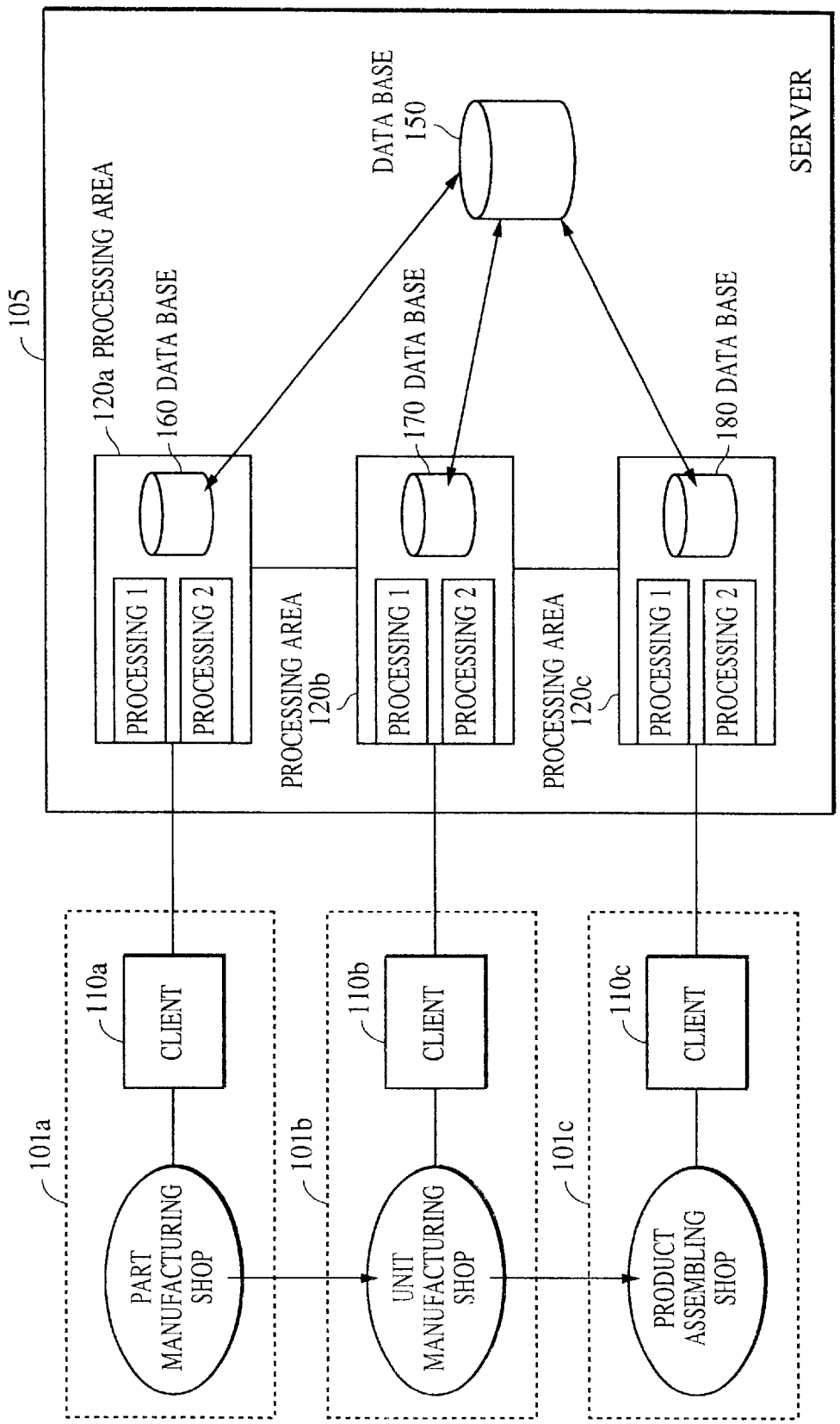
FIG. 1 is a block diagram showing a quality management system according to one embodiment of the present invention.

The client-and-server system of FIG. 2 is shown in greater detail in FIG. 1, which shows the relationship among the clients, the server and shops. As used herein, the term "shop" means a work unit such as a production line in a factory.

The system shown in FIG. 1 includes three shops: a part manufacturing shop 101a, a unit manufacturing shop 101b, and a product ("Body") assembling shop 101c. A server 105 (equivalent to 210 in FIG. 2) includes three processing areas 120a, 120b, 120c with each processing area corresponding to a respective shop.

The processing areas 120a, 120b, 120c are used to execute processing for component management in the shops 101a, 101b, 101c independently of one another. Storage areas provided by directories partitioned in the secondary storage 304c (FIG. 3) or the external storage 308 (FIG. 3) are used for data bases 160, 170, 180 corresponding to the processing areas 120a, 120b, 120c, respectively. The data bases 160, 170, 180 contain data necessary and sufficient for executing independent processes. Data that is referred to the processing areas from one client to another is stored in a server data base 150. Instructions for ordering resulted from processing executed in the processing areas are issued from the server 105 to clients 110a, 110b, 110c which are located, respectively, in the part manufacturing shop 101a, the unit manufacturing shop 101b, and the product assembling shop 101c.

Figure 16:
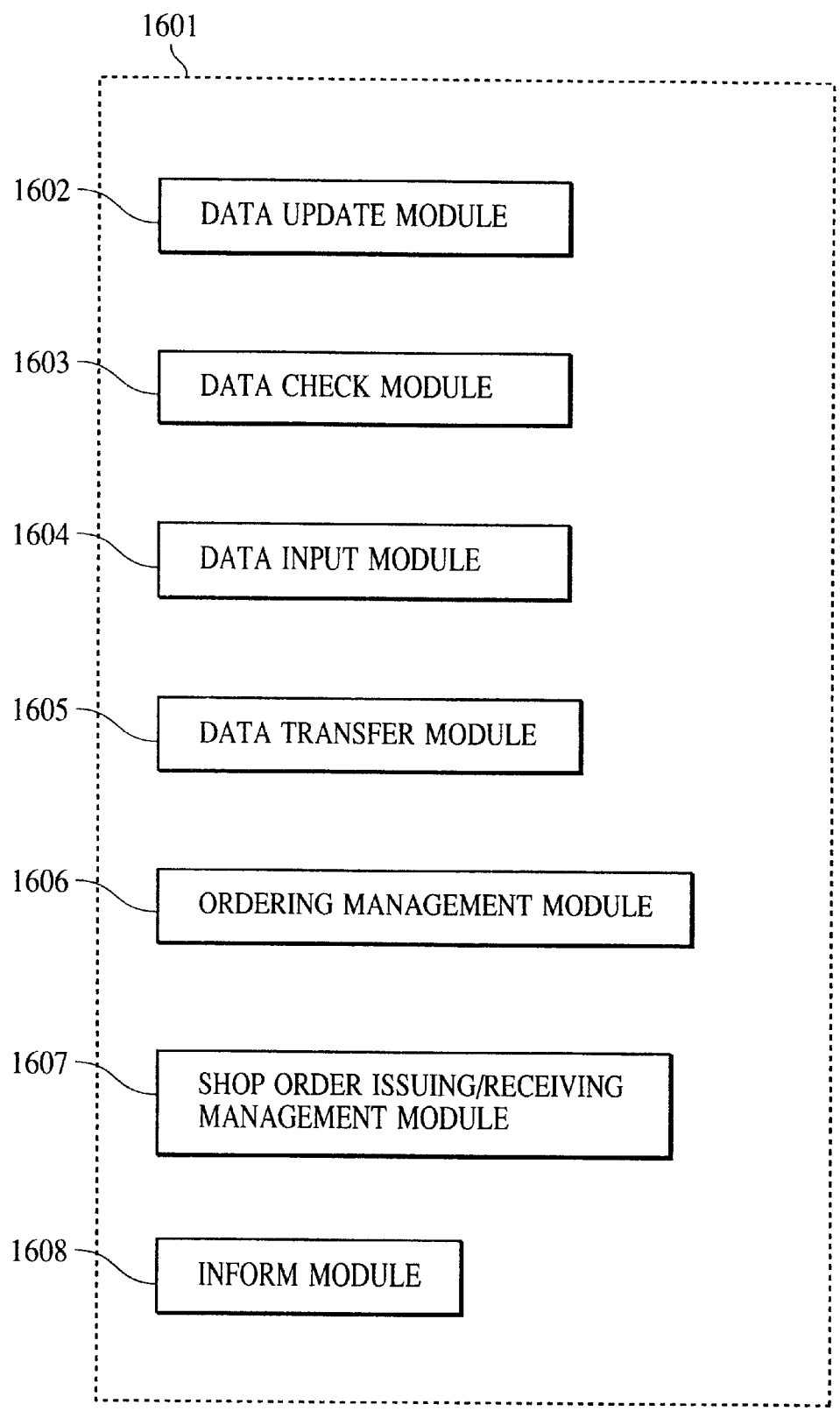
FIG. 16 is a representation showing a set of software modules used in an embodiment of the present invention.

Order issuing/receiving management between the shops is executed by a shop order issuing/receiving management module 1607 in program 1601, shown in FIG. 16. In the order issuing/receiving process shown in FIG. 7, for example, the unit D used in a product "Body" (made in assembling shop 701) is ordered from a unit D manufacturing shop 702, and likewise the part d used in the unit D (made in manufacturing shop 702) is ordered from a part d manufacturing shop 703. The correlation between the shops, i.e., which part or unit is ordered from which shop, is registered as processing area information in configuration management tables 970, 980 (shown in FIG. 9).

Figure 5:
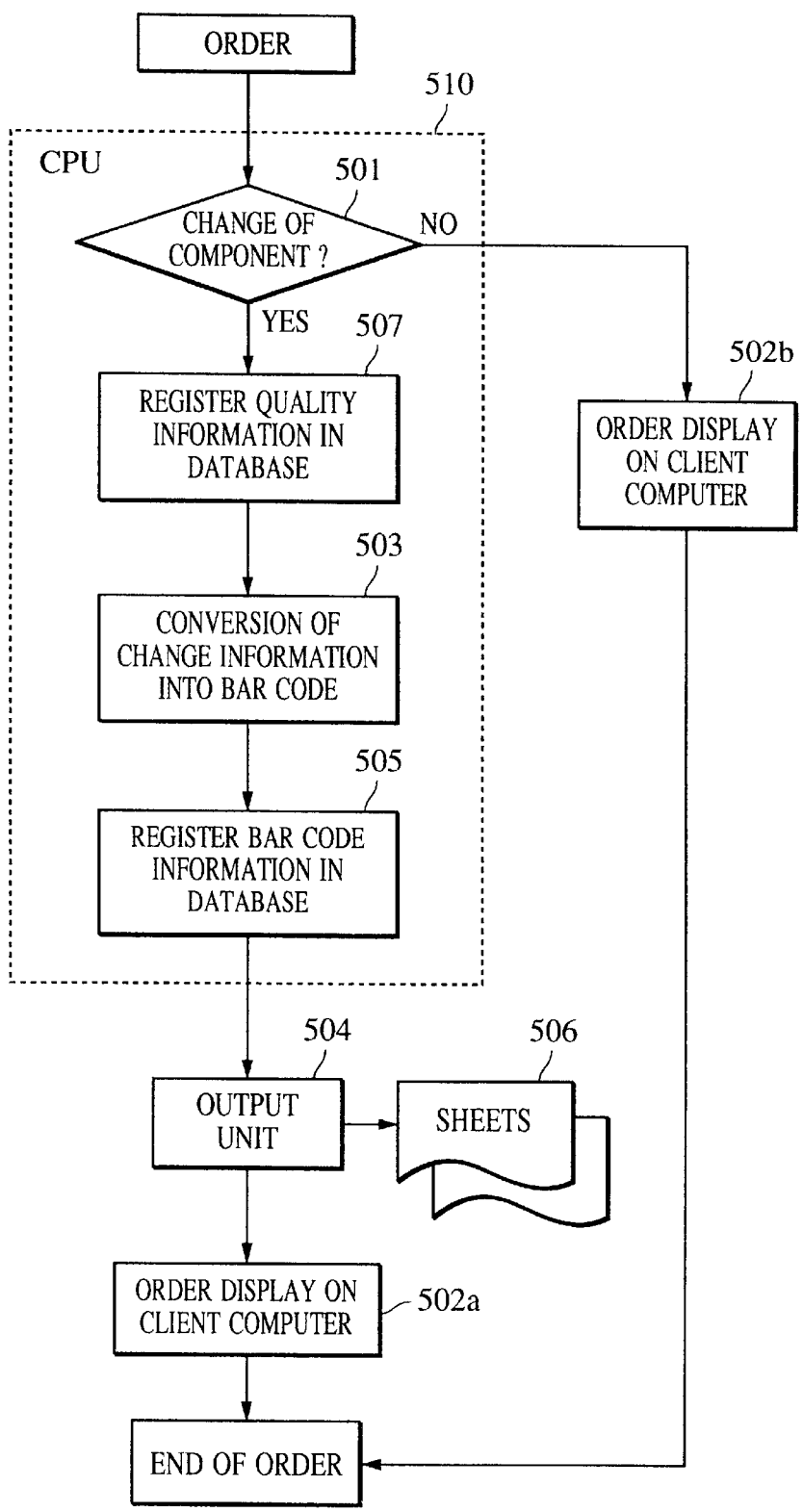
FIG. 5 is a flowchart showing a process executed when quality information is changed.

FIG. 5 is a flowchart that shows an ordering process to be executed by the server 105 in the case where an order instruction issued from the server 105 includes a change of a component. If it is determined, in step 501, a component which has undergone a specification change is ordered, then quality information of the changed component is registered in the appropriate data bases (150, 160, 170 and 180 in FIG. 1) on the server side along with the order number in step 507, and the order number is converted into a bar code in step 503. Binary information representing the bar code is also registered in the data base on the server side in step 505.

Further, the bar code is printed in step 504 (by the output unit 310 which produces output sheets 506) and an order is displayed on the client computer of the corresponding shop in step 502a.

Figure 15:
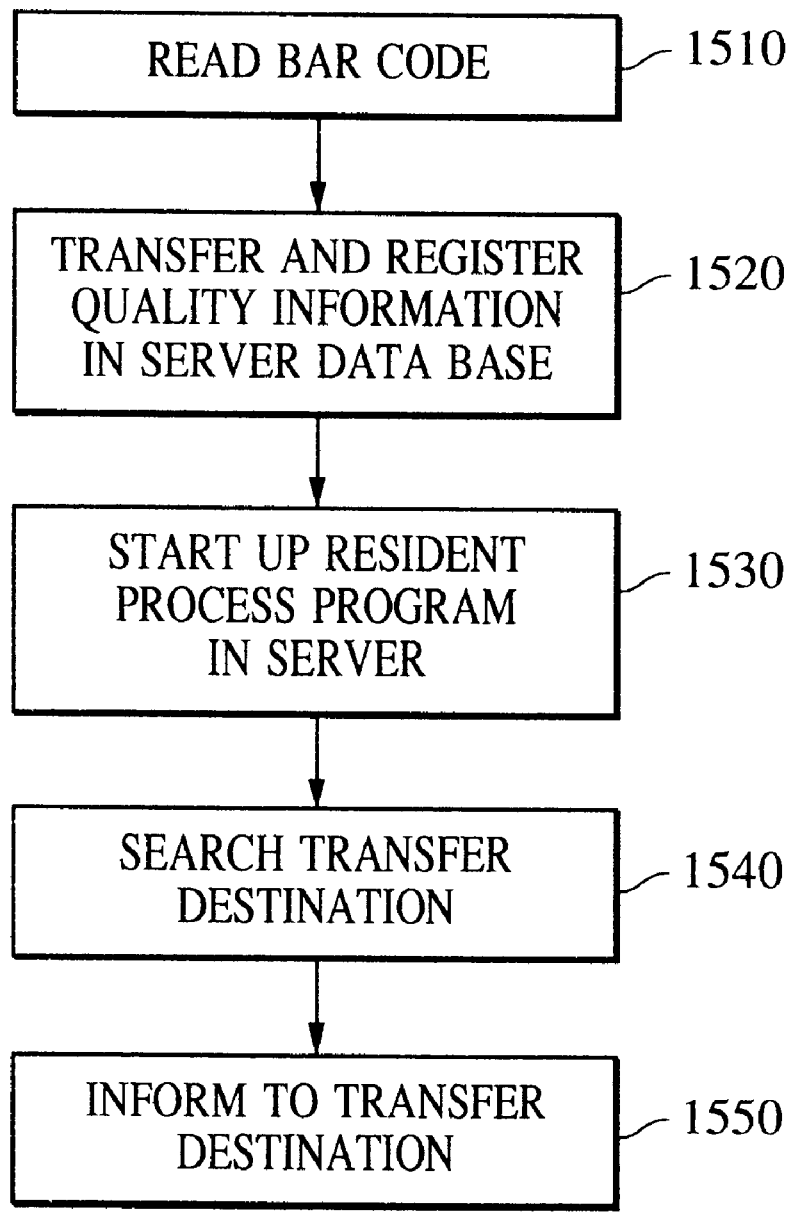
FIG. 15 is a flowchart explaining how to inform quality information.

The process of registering (storing) the quality information of the ordered component in the data base of the server 105 (FIG. 1) and outputting it in the form of a sheet from the output unit 310 (FIG. 3) is carried out by an ordering management module 1606 in a program 1601 (FIG. 16). The ordering management module 1606 also executes the process of converting the order number into a bar code. Logical decisions made by the ordering management module 1606, such as the steps in region 510 of FIG. 15, are processed by the CPU 303 of the computer 301 (FIG. 3) constituting each of the clients and the server.

Returning now to FIG. 5, if it is determined that there is no change of a component in step 501, then an instruction is given to the corresponding shop by displaying an order on the client computer in step 502b. In this case, though not shown, a sheet including a bar code printed thereon is also outputted from the output unit as with the above-mentioned step 504. Each shop confirms the order issuing/receiving situation from the orders displayed in steps 502a and 502b on the display screen of the client computer. The outputted sheet and the changed substance are transferred in a matched relationship, as a connected pair, between the shops 701, 702 and 703, shown in FIG. 7.

While the order number is converted into a bar code in this embodiment, the same result can also be obtained by converting the production number, the model number or the like into bar code information. It is thus essential that any quality information which can uniquely specify a component is converted into a bar code. A bar code standard is not limited to the CODE 39 standard which is usually employed for industrial purposes, but may be any kind of standard (such as the ISO standard) which can be read as a combination of binary numerals by the input unit 307 (FIG. 3).

Figure 7:
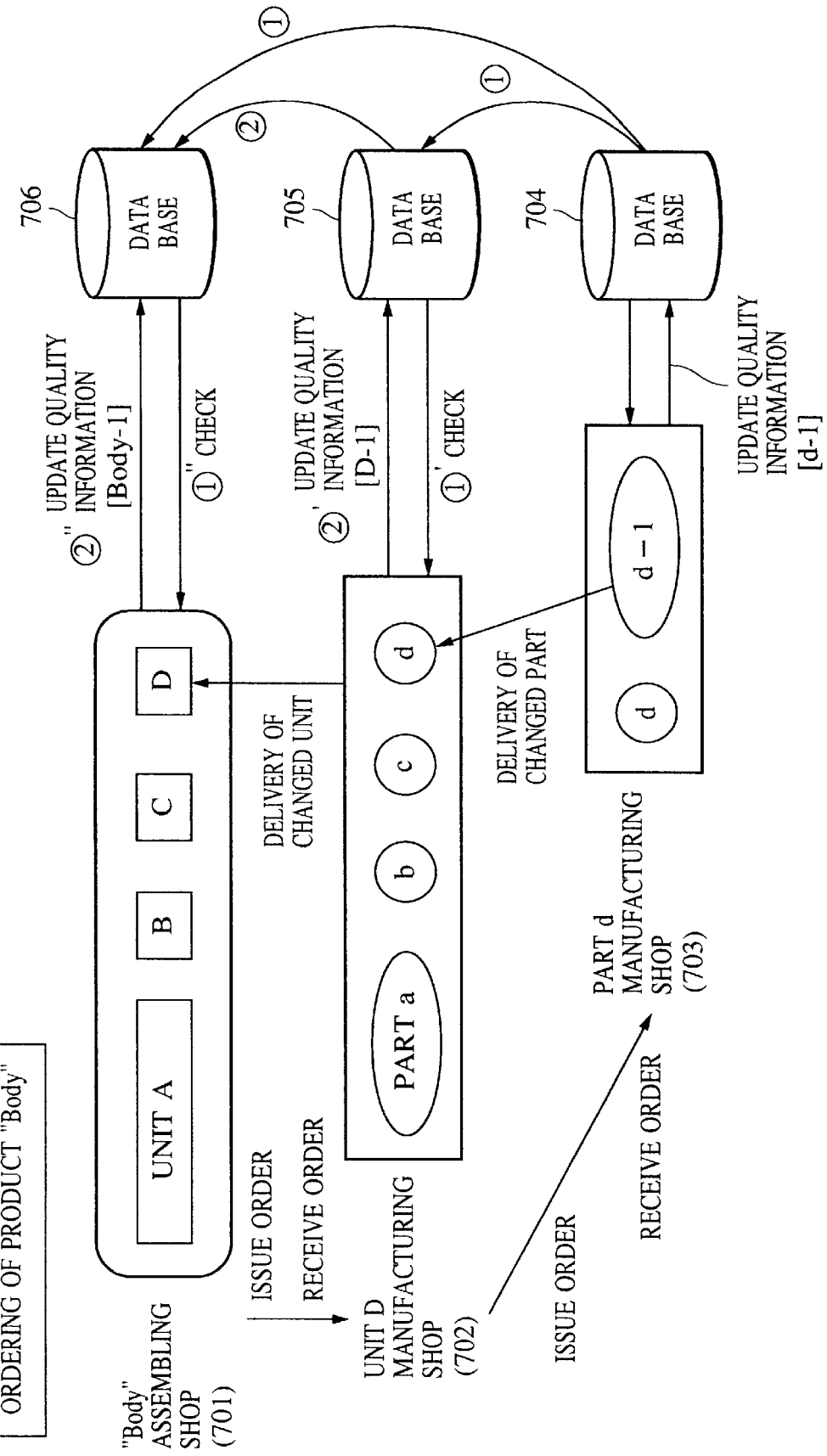
FIG. 7 is a block diagram showing the correlation between ordering of a component and receiving an order.

Assume now that the product "Body" is ordered in FIG. 7, the product comprises four units "A", "B", "C" and "D", and the unit "D" is made up of four units "a", "b", "c" and "d". The model numbers, maker names and so on of each of the parts are stored as quality information in the data bases 150, 160, 170, 180 of the server 105 (FIG. 1) for management. The data stored in the server data base 105 is attribute data common to the processing areas 120*a*, 120*b*, 120*c*. Attribute decisions are made by the respective CPU 303 (FIG. 3) by determining, e.g., the presence or absence of a flag attached to each item of data. Programs for executing this decision process at the time of ordering are included in data input module 1604 (FIG. 16) and at the time of updating data after delivery in data update module 1602 (FIG. 16).

Information of the changed part is registered in the data base 150 so that the shops can share the change information.

FIG. 6 shows an example of quality information in the expression form of "name (component 1, component 2, . . .)". If the "name" is the product "Body" (601), factors are given by units, and if the "name" is the unit (602), factors are given by parts. These data are managed in the data bases (160, 170, 180 of FIG. 1) of the processing areas (120*a*, 120*b*, 120*c* of FIG. 1) corresponding to the respective shops in terms of the appropriate components so that assembly of parts into a unit and assembly of units into a product can be tracked.

In this embodiment, the ordering management module 1606 of program 1601 (FIG. 16) functions as first input means. Specifically, the ordering management module 1606 functions to register (store) the quality information of the ordered part in the data base of the server 105 (FIG. 1), and print an output on a sheet from the output unit 310 (FIG. 3).

<Explanation of Data Check>

Turning now to FIG. 7, where quality information is described in the expression form of "name (component 1, component 2, . . . )" as described above, the quality information registered in the unit D manufacturing shop 702 at the ordering time would be D(a, b, c, d). Likewise, the quality information registered in the product "Body" assembling shop 701 at the ordering time is "Body" (A, B, C, D).

If, on the other hand, in response to a change instruction, the part d manufacturing shop 703 updates and registers quality information of the part "d-1", (which is substituted for the part "d"), it will also update its own data base 704. Upon updating of the data base 704, data of the quality information for part "d-1" is transferred via path ① to the shops 701, 702 which were expecting the part "d". At this point in time, the shops 701, 702 know that the part has been changed from "d" to "d-1" in the shop 703, but cannot determine which particular parts or units have been changed.

When a part is delivered from the part d manufacturing shop 703 to the unit D manufacturing shop 702, the fact that the part "d-1" has been substituted for the part "d" is determined as a result of reading the bar code associated with the part "d-1" and comparing the data of the read bar code with the data base 705 via path ①'. At this point in time, the shop 702 can match the information of the changed part with the particular part that was actually received.

Quality information of the unit using the changed part is then updated from D(a, b, c, d) to D-1(a, b, c, d-1) and stored in the data base 705 via path ②'. Upon updating of the data base 705, data of the quality information is transferred to the product "Body" assembling shop 701 using the unit "D" via path ②. At this point in time, the product "Body" assembling shop 701 knows that the unit has been changed from "D" to "D-1" in the shop 702, but cannot determine which particular units have been changed.

When a unit is delivered from the unit D manufacturing shop 702 to the product "Body" assembling shop 701, the fact that the unit "D-1" has been substituted for the unit "D" is determined as a result of reading the bar code associated with the unit "D-1" and comparing the data of the read bar code with the data base 706 via path ①". At this point in time, the product "Body" assembling shop 701 can match the information of the changed unit with the particular unit that was actually received.

The product "Body" assembling shop 701 then updates quality information in the data base 706 via path ②' such that the quality information of "Body"(A, B, C, D) at the ordering time is replaced by "Body"(A, B, C, D-1) representing the use of the unit D-1.

The above updated results are registered in the server data base 150 (FIG. 1) so that the shops can share the changed quality information. Specifically, each shop can know that the changed part is "d-1", the unit using the changed part is "D-1", and the product using the changed unit is "Body-1".

As described above, when each shop updates its own data base, it also transfers the data to one or more shops that will use the changed component. By correlating each delivered component with the quality information transferred beforehand, the shop uniquely specifies the changed part, unit or product so that complete quality information is maintained.

<Program Processing for Data Check>

In FIG. 7, when the part d manufacturing shop 703 delivers the part "d-1" instead of "d" to the unit D manufacturing shop 702, the changed part "d-1" is delivered as a connected pair with a sheet having the bar code printed on it. Upon receiving the part "d-1", the shop 702 reads as an input the bar code printed on the sheet using the bar code reader (input unit 307, FIG. 3). A data input module 1604 (FIG. 16) is started up in response to the input read by the bar code reader. The data input module 1604 stores the read binary data in at least one of the RAM 304*b*, the secondary storage 304*c*, and the external storage 308 of the computer 301 (all in FIG. 3).

After the read binary data has been stored, a data check module 1603 (FIG. 16) is started up which compares the quality information registered in the data base 705 (FIG. 7) (to which the change information has been transferred beforehand) with the quality information of the delivered substance. A checking process is executed by the data check module 1603 (FIG. 16) following a process shown in FIG. 8.

Figure 8:
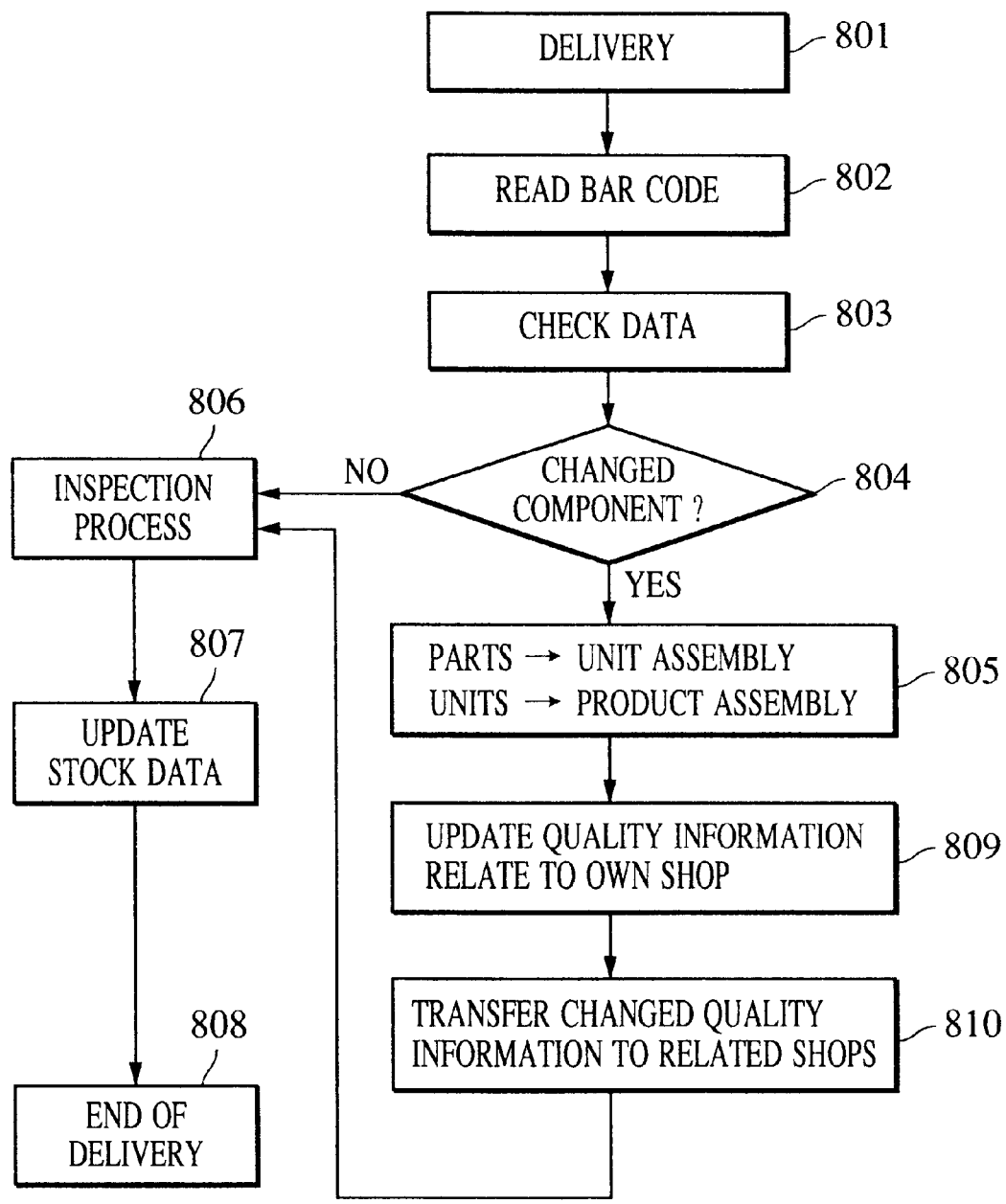
FIG. 8 is a flowchart showing a delivery process.

In the delivery process of FIG. 8, the order number in the form of a bar code printed on a sheet is read in step 802, and the read data is then checked in step 803. Specifically, the read data is checked with the bar code information that has been registered in step 505 of FIG. 5 in the server data base 160, 170, 180 (FIG. 1). Returning to FIG. 8, based on a result of the data check, it is determined in step 804 whether the associated component has changed. If the checked component is not a changed one, then an inspection process is executed in step 806. This involves determining the type of the delivered component and confirming the number of the delivered component. Stock data is then updated in step 807 so as to reflect the inspection results on the server data bases 160, 170, 180. The delivery process executed by the data check module 1603 is completed upon the end of the updating in step 808.

Returning now to step 804 of FIG. 8, if the bar code information representing the order number of the changed component, that is stored in the server data base 160, 170, 180 (FIG. 1)), is coincident with the bar code information read from the sheet associated with the delivered component, then the component being checked is determined to be a changed one. Upon coincidence between both data of the bar code information, the relevant shop uniquely specifies the changed component and confirms the arrival of the changed component. If the changed component is uniquely specified at the time each given component is received, it is then easy to subsequently track the changed component in the shop. The relevant shop retrieves, through management of its own working process, a past record indicating in which unit or product the changed component has been assembled in step 805.

The relevant shop then updates its own quality information accordingly in step 809. For example, the unit D manufacturing shop 702 in FIG. 7 updates the quality information at the ordering time (i.e., D(a, b, c, d)) to D-1(a, b, c, d-1), and also updates the quality information in the server data base 705.

Returning now to step 810 of FIG. 8, the updated information is transferred to one or more shops using the changed part (e.g., the "Body" assembling shop). Transfer of the updated information is executed by a data transfer module 1605 (FIG. 16).

After transfer of the updated information, the data check module 1603 (FIG. 16) starts the inspection process (FIG. 8, 806) to update the type and number of the delivered parts (FIG. 8, step 807). The delivery process to be executed by the data check module 1603 (FIG. 16) is completed upon the end of the updating in FIG. 8, step 808.

Taking the unit manufacturing shop 101b in FIG. 1 as an example, the shop 101b not only updates its own data base 170, but also transmits and registers information of the changed unit to and in the data base 180 of the product assembling shop 101c which uses the changed unit.

In this embodiment, the data input module 1604 (FIG. 16), which is started up in response to a read input from the input unit 307 (e.g., a bar code reader), functions as second input means. In other words, the data input module 1604 functions to store the read binary data in the RAM 304b, the secondary storage 304c, or the external storage 308 of the computer 301 (all in FIG. 3).

Further, in this embodiment, the data check module 1603 (FIG. 16) functions as check means for checking the quality information at the ordering time of a component with the quality information at the delivery time thereof. More specifically, the data check module 1603 determines whether the component being checked is the changed one or not, by checking the bar code information read at the delivery time against the bar code information that is stored in the server data bases 160, 170, 180 (FIG. 1) at the ordering time (i.e., the information registered in step 505 of FIG. 5). In addition, the data check module 1603 also functions as means for executing the inspection process of the delivered component and updating the stock data.

In this embodiment, the data update module 1602 (FIG. 16) functions as update means for updating the information stored in the server data bases 160, 170, 180 (FIG. 1). Stated otherwise, when the component being checked is determined to be a changed one, through the process executed by the data check module 1603, the data update module 1602 updates the quality information of the changed component with the quality information at the delivery time thereof.

In this embodiment, the data transfer module 1605 functions as transmission means for transmitting the updated quality information of the changed component to one or more shops using the changed component.

Figure 9:
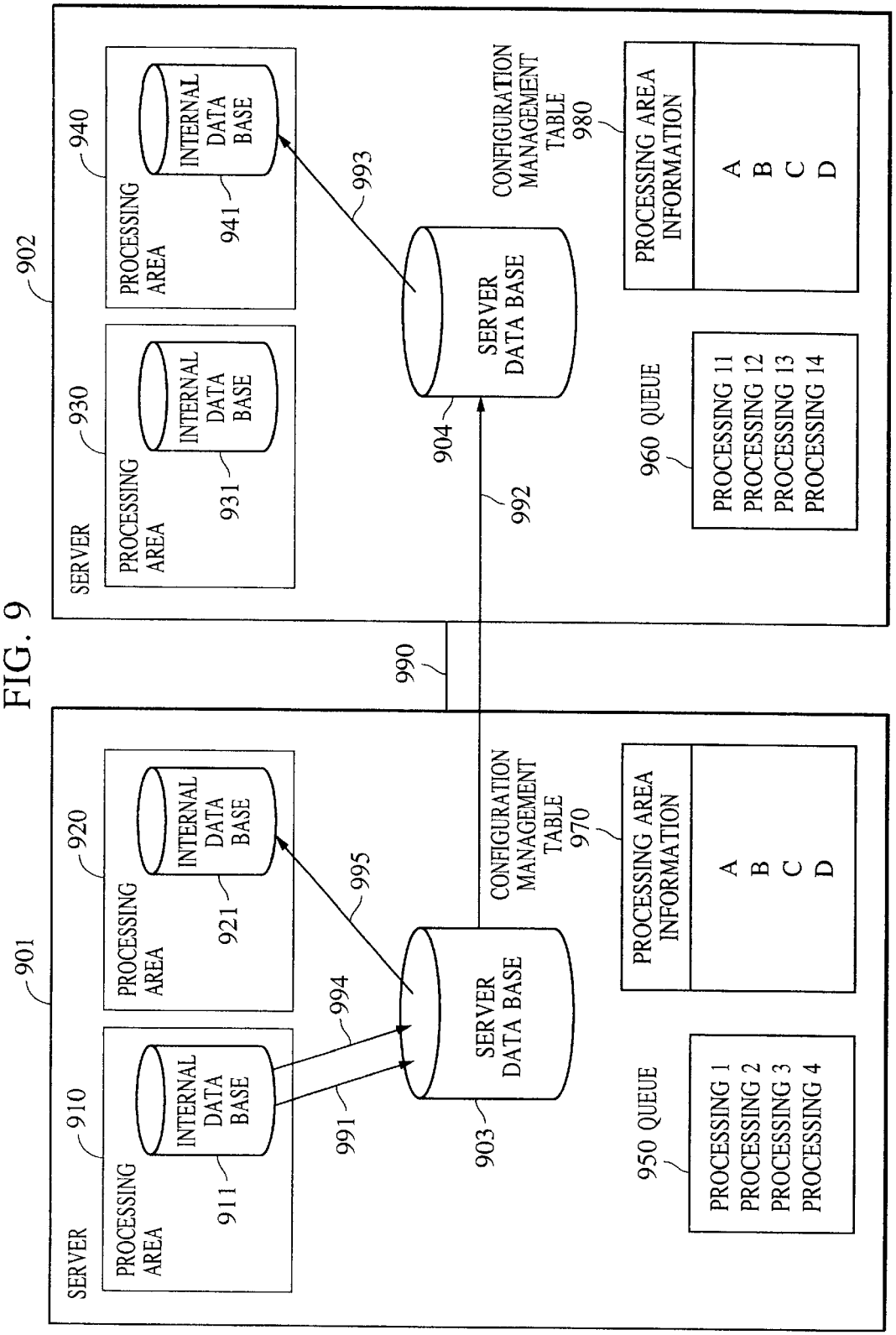
FIG. 9 is a block diagram for explaining transfer of quality information.
Figure 10:
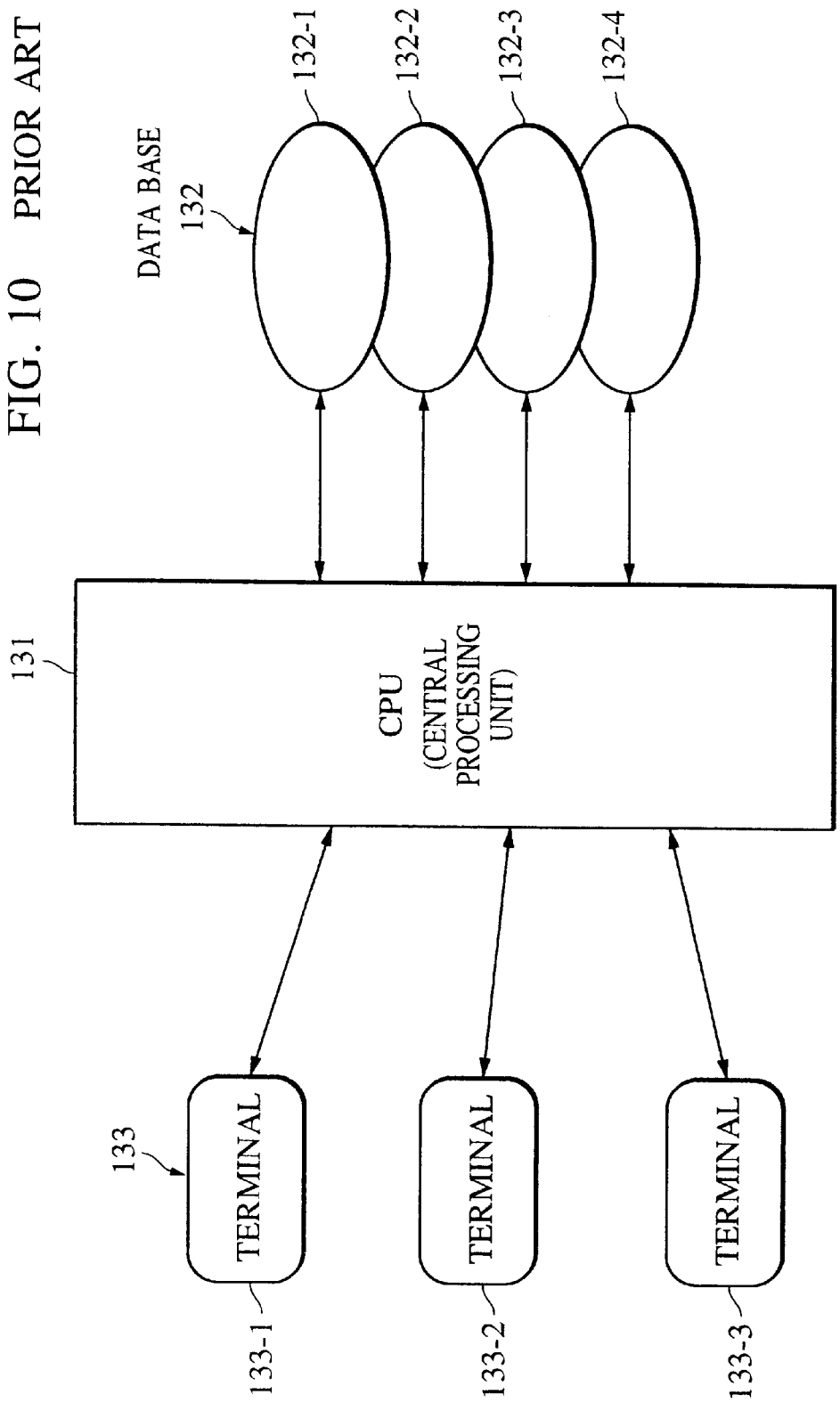
FIG. 10 is a block diagram for explaining a component ordering system of the related art.

Moreover, in this embodiment, a shop order issuing/receiving management module 1607 functions as management means for managing the order issuing/receiving relationship between the shops. More specifically, the shop order issuing/receiving management module 1607 keeps track of which component is ordered from which shop, and registers the relationship under the management as processing area information in the configuration management tables 970, 980 (shown in FIG. 9). The data transfer module 1605 carries out data transfer by referring to the configuration management tables 970, 980 (FIG. 9).

<Electronic Main Transmission in Response to Bar Code Input>

A process of transmitting electronic mail to the concerned persons in the design and quality departments, who have been registered beforehand, when the bar code information is read and input from the sheet in the delivery process, will be described with reference to FIGS. 13–15 which are, respectively, a block diagram, a flowchart, and a conceptual model of a system for informing delivery of the changed component.

First, in step 1510 of FIG. 15, the shop receiving the delivered component reads the bar code information from the sheet that has been transferred together with the component.

Figure 14:
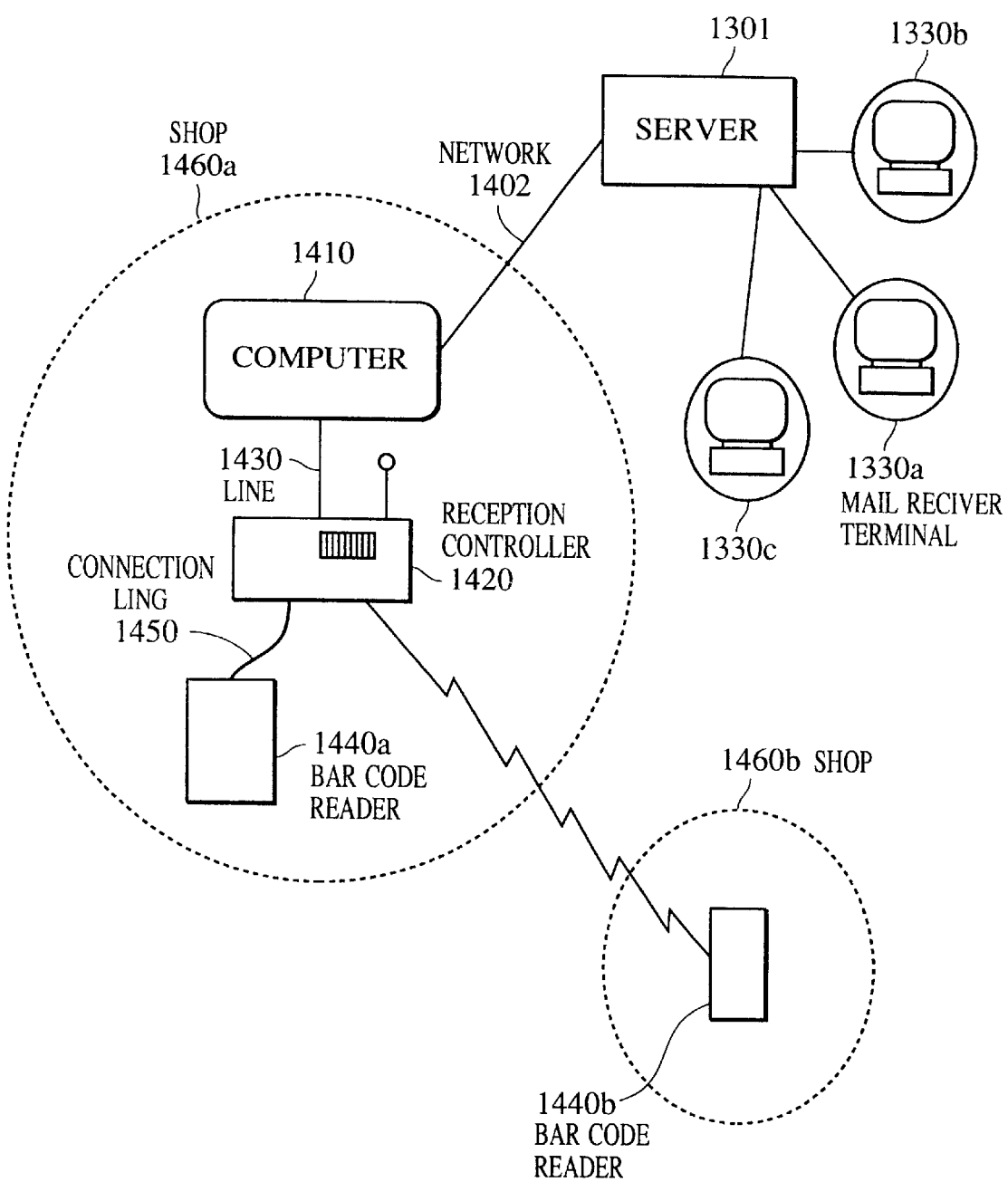
FIG. 14 is a schematic representation explaining the reading of bar code signals.

As shown in FIG. 14, the bar code information is read by a bar code reader 1440a or 1440b. The bar code readers 1440a, 1440b transmit the read data to a reception controller 1420 through a cable or in a wireless manner, respectively. The bar code reader 1440a is connected to the reception controller 1420 through a connection line 1450. The bar code reader 1440b transmits data to the reception controller 1420 with a wireless signal of particular frequency. This configuration enables data to be transmitted between different buildings or factories; i.e., a data reading shop 1460b in one building and a data receiving shop 1460a in another building.

The reception controller 1420 is connected to a computer 1410 through a line 1430 which could be, for example, an RS-232C line).

The bar code information read by the bar code reader 1440a, 1440b is stored in the RAM 304b (or the secondary storage 304c or the external storage 308 all shown in FIG. 3) of the computer 1410 under control of the data input module 1604 (FIG. 16).

After the bar code information has been stored, the quality information registered in the data base of a server 1301 is compared or checked with the quality information of the delivered component, which has been read by the bar code reader, under control of the data check module 1603 (FIG. 16). A check result is reflected on the data base of the server 1301 by updating it under control of the data update module 1602 (FIG. 16).

Figure 13:
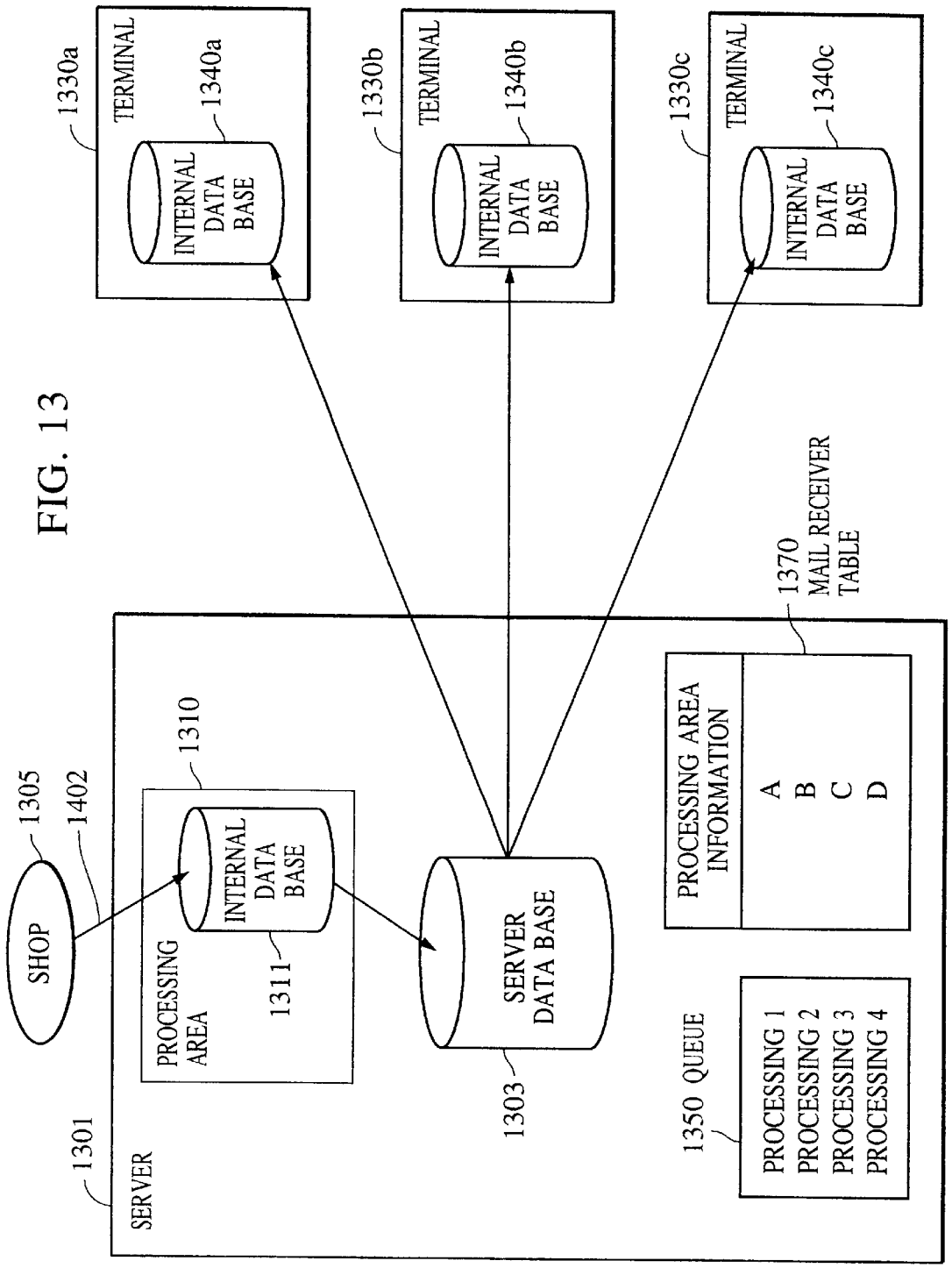
FIG. 13 is a block diagram explaining notices of quality information.

Taking the case of FIG. 13 as an example, the bar code information read in a shop 1305 is checked and then transferred to an internal data base 1311 of a processing area 1310 and a server data base 1303 in a server 1301 connected to the shop 1305 through a LAN network 1402 for updating the quality information in the data bases. This operation corresponds to step 1520 in FIG. 15. After updating of the quality information, quality data is spooled as processing 1 in a queue 1350 (FIG. 13) to wait for an informing process.

When the quality data is spooled in the queue 1350 to wait for the informing process, a resident process program (an inform module 1608 of FIG. 16) in the server 1301 is started up to begin a mail transfer process for the quality data. This corresponds to step 1530 in FIG. 15.

Next, in step 1540, the inform module 1608 searches terminals of the transfer destinations to identify the IP address, password, and user ID of the relevant terminal from a mail receiver table 1370 (FIG. 13).

The inform module 1608 identifies terminals 1330*a*, 1330*b*, 1330*c* by using the IP address, password, and user ID of the relevant mail receiver as key information, and informs the delivery of the changed component to the mail receiver in step 1550 in FIG. 15.

In FIG. 14, if data cannot be transferred because of an abnormality occurred in the LAN network 1402, the data is temporarily backed up in memory means (such as the RAM 304*b*, the secondary storage 304*c* or the external storage 308, shown in FIG. 3) of the computer 1410 (FIG. 14). When the LAN network 1402 returns to a normal communication state, the backed-up data is retransmitted. Of course, the function of retransmitting data is not limited to the mail informing process, and can be implemented in other embodiments as well.

In this embodiment, the inform module 1608 (FIG. 16) functions as inform means. Specifically, the inform module 1608 functions to search the terminals of the transfer destinations, identify the IP address, password, and user ID of the relevant terminal from the mail receiver table 1370 (FIG. 13), and inform the delivery of the changed component to the mail receiver.

<Data Transfer between Shops in Different Servers>

Transfer of quality information between shops using different servers will be described below with reference to FIG. 9. Assume that a processing area 910 of a server 901 receives the changed part "d-1" delivered thereto. The quality information stored in an internal data base 911 is updated from D(a, b, c, d) to D-1(a, b, c, d-1).

Information indicating that the part "d" is replaced by "d-1" and the unit "D" is replaced by "D-1" using the new part arrives via data bus 991 and is registered as quality information in a server data base 903. Updating of information in the data bases 911 and 903 is processed under control of the data update module 1602 (FIG. 16). When the quality information in the data base is changed, the data transfer module 1605 (FIG. 16, referred to as a resident process A hereinafter) in the server 901 is started up, whereby a transfer process of the quality information begins (such that the quality information is successively transferred to the queue 950) (processing 1, 2, 3, 4).

The resident process A extracts the data to be transferred from the data base 903. Then, the resident process A searches and identifies the IP address, password, and user ID of the processing area at the transfer destination from the configuration management table 970. In the configuration management tables 970 and 980, the order issuing/receiving relationship between the shops is defined by the shop order issuing/receiving management module 1607 (FIG. 16).

Where a result of the search shows that the transfer destination is a shop which is not in the same server, the resident process A writes the transferred data, via data bus 992, in a data base 904 of a server 902, and registers it as processing 11 in a queue 960.

Upon data being registered as the processing 11, the data transfer module 1605 (FIG. 16, referred to as a resident process B hereinafter) in the server 902 is started up, causing data transfer to begin again.

The resident process B extracts the data to be transferred from the data base 904. Then, the resident process B searches and identifies the IP address, password, and user ID of the processing area at the transfer destination from the configuration management table 980.

The resident process B checks the processing area 940 by using the IP address, password, and user ID of the processing area at the transfer destination as key information, and writes the transferred data in an internal data base 941 via data bus 993.

<Transfer of Quality Information in Same Server>

Where quality information is transferred in the same server, it is processed in a similar manner. When the quality information is changed and instructed to be registered from the processing area 910 and transferred to a processing area 920, the data update module 1602 (FIG. 16) updates the quality information in the data bases 911 and 903. After the changed quality information has been updated and registered, the data transfer module 1605 (resident process A) is started up, causing a transfer process to begin via data bus 994.

The resident process A extracts the data to be transferred from the data base 903. Then, the resident process A searches and identifies the IP address, password, and user ID of the processing area at the transfer destination from the configuration management table 970.

The resident process A checks the processing area 920 by using the IP address, password, and user ID of the processing area at the transfer destination as key information, and writes the transferred data to an internal data base 921 via data bus 995.

<Supply in the Form of Storage Medium>

The program 1601 (FIG. 16) for realizing the above-described functions of this embodiment includes the following modules: the ordering management module 1606 for registering the quality information at the ordering time in the server data base and converting the quality information into a bar code, followed by outputting it on a sheet; the data input module 1604 for reading and inputting the quality information of the delivered component; the data check module 1603 for checking the quality information registered in the server side with the quality information of the delivered component; the data update module 1602 for updating the quality information registered in the server data base at the ordering time in accordance with the quality information at the delivery time; the data transfer module 1605 for transferring the updated quality information to one or more shops using the delivered component; the shop order issuing/receiving management module 1607 for managing the order issuing/receiving relationship between the shops; and the inform module 1608 for informing the delivery of the ordered component.

The above-described functions of this embodiment can also be achieved by supplying, to a system or apparatus, a storage medium on which program codes of the program 1601 are recorded, and causing a computer (e.g., a computer or microprocessor) in the system or apparatus to read the program codes stored in the storage medium and to execute them.

In such a case, the program codes read from the storage medium serve in themselves to realize the above-described functions of the embodiment; hence the storage medium storing the program codes constitutes this embodiment of the present invention.

Suitable media for storing the program codes include, for example, floppy disks, hard disks, optical disks, photo-magnetic disks, CD-ROMs, CD-Rs, magnetic tapes, non-volatile memory cards, and ROMs.

The above-described functions may also be implemented by an OS (Operating System) or the like, which is running on the computer, to execute part or whole of the actual processing.

Further, the present invention may also be implemented such that the program codes read from the storage medium are written into a memory of a function add-in board incorporated in a computer or a function add-in unit connected to the computer. A processor incorporated in the function add-in board or unit then executes part or whole of the actual processing in accordance with instructions from the program codes, thereby realizing the above-described functions.

When the present invention is applied to a storage medium as mentioned above, program codes corresponding to the above-described flowcharts (FIGS. 5 and 8) and modules (FIG. 16) are stored in the storage medium. In other words, required ones of the ordering management module 1606, the data input module 1604, the data check module 1603, the data update module 1602, the data transfer module 1605, the shop order issuing/-receiving management module 1607, and the inform module 1608 are stored in the storage medium.

With the quality management according to the above-described embodiments, when there occurs change of a component used, change information and the component itself can be correlated to each other, and quality information of the component can be managed even when the component is transferred through different working areas. By making it possible to determine the arrival of the changed component at an appropriate point in time, improved quality management can be realized.

What is claimed is:

1. A system for managing quality information of a component, comprising:
    first input means for inputting quality information of an ordered component, which is changed, when quality information of an ordered component is changed;
    storage means for storing said quality information of the ordered component which is changed and that of a unit using said component;
    second input means for inputting quality information of a delivered component;
    check means for checking the quality information of the delivered component input by said second input means with that of said ordered component which is changed and stored in said storage means;
    update means for updating the quality information stored in said storage means when it is judged that said two quality information coincide by said check means; and
    transmission means for transmitting the quality information of the unit using said component to a shop using said unit.

2. The system for managing quality information of a component according to claim 1, wherein said transmission means transmits the updated quality information before the component is delivered to the shop.

3. The system for managing quality information of a component according to claim 1, wherein said transmission means transmits the updated quality information soon after the quality information has been updated by said update means.

4. The system for managing quality information of a component according to claim 1, wherein the quality information contains at least one of the model number and maker name of the component.

5. The system for managing quality information of a component according to claim 1, further comprising informing means for informing delivery of the component in response to an input of the quality information made by said second input means.

6. The system for managing quality information of a component according to claim 5, wherein said informing means informs delivery of the component to a terminal provided in the shop which uses the delivered component.

7. The system for managing quality information of a component according to claim 5, wherein said inform means comprises electronic mail.

8. A method for managing quality information of a component, the method comprising the steps of:
    inputting quality information of an ordered component, which is changed, when quality information of an ordered component is changed;
    storing the quality information of the ordered component which is changed and that of a unit using said component, in storage means;
    inputting quality information of a delivered component;
    checking the inputted quality information of the delivered component with that of said ordered component which is changed and stored in said storage means;
    updating the quality information stored in said storing step when it is judged that said two quality information coincide by said checking step; and
    transmitting the quality information of the unit using said component to a shop using said unit.

9. The method for managing quality information of a component according to claim 8, wherein the updated quality information is transmitted before the component is delivered to the shop.

10. The method for managing quality information of a component according to claim 8, wherein the updated quality information is transmitted soon after the quality information has been updated.

11. The method for managing quality information of a component according to claim 8, wherein the quality information contains at least one of the model number and maker name of the component.

12. The method for managing quality information of a component according to claim 8, further comprising the step of informing delivery of the component in response to an input of the quality information of the delivered component.

13. The method for managing quality information of a component according to claim 12, wherein delivery of the component is informed to a terminal provided in the shop which uses the delivered component.

14. A storage medium upon which computer executable process steps for managing quality information of a component are stored, the steps comprising:
    storing quality information of an ordered component which is changed, and that of a unit using said component, in storage means;
    inputting quality information of a delivered component;
    checking the inputted quality information of the delivered component input by said input step with that of said ordered component which is changed and stored in said storage means;
    updating the quality information stored in the storage means when it is judged that said two quality information coincide by the checking step; and
    transmitting the quality information of the unit using said component to a shop using said unit.

15. A system for managing quality information of a component, comprising:
    first input means for inputting quality information of an ordered component, which is changed, when quality information of an ordered component is changed;
    storage means for storing said quality information of the ordered component which is changed and that of a unit using said component;
    second input means for inputting quality information of a delivered component;

check means for checking the quality information of the delivered component input by said second input means with that of said ordered component which is changed and stored in said storage means; and informing means for informing delivery of the component in response to an input of the quality information made by the second input means.

16. The system for managing quality information of a component according to claim 15, wherein said informing means informs delivery of the component to a terminal provided in a shop which uses the delivered component.

17. The system for managing quality information of a component according to claim 15, further comprising update means for updating the quality information loaded in said storage means in accordance with a check result from said check means.

18. The system for managing quality information of a component according to claim 15, wherein the quality information contains at least one of the model number and maker name of the component.

19. The system for managing quality information of a component according to claim 15, wherein said informing means comprises electronic mail.

20. A method for managing quality information of a component, comprising the steps of:

storing quality information of an ordered component, which is changed and that of a unit using said component, in storage means;

inputting quality information of a delivered component;

checking the quality information of the delivered component input by said inputting step with that of said ordered component which is changed and stored in said storage means; and informing delivery of the component in response to an input of the quality information of the delivered component.

21. The method for managing quality information of a component according to claim 20, wherein delivery of the component is informed to a terminal provided in a shop which uses the delivered component.

22. The method for managing quality information of a component according to claim 20, further comprising the step of updating the stored quality information in accordance with a check result.

23. The method for managing quality information of a component according to claim 20, wherein the quality information contains at least one of the model number and maker name of the component.

24. A storage medium upon which computer executable process steps for managing quality information of a component are stored, the steps comprising:

storing quality information of an ordered component in storage means;

inputting quality information of a delivered component;

checking the inputted quality information of the delivered component by checking data maintained in a matched relationship with the delivered component; and informing delivery of the component in response to an input of the quality information of the delivered component.

25. The system for managing quality information of a component according to claim 1, wherein the data maintained in a matched relationship comprises bar code data.

26. The system for managing quality information of a component according to claim 1, wherein the check means compares the quality information of the ordered component stored in said storage means with the data maintained in a matched relationship.

27. The method for managing quality information of a component according to claim 8, wherein the data maintained in a matched relationship comprises bar code data.

28. The method for managing quality information of a component according to claim 8, wherein, in said checking step, the stored quality information of the ordered component is compared with the data maintained in a matched relationship.

29. The system for managing quality information of a component according to claim 15, wherein the data maintained in a matched relationship comprises bar code data.

30. The system for managing quality information of a component according to claim 15, wherein the check means compares the quality information of the ordered component stored in said storage means with the data maintained in a matched relationship.

31. The method for managing quality information of a component according to claim 20, wherein the data maintained in a matched relationship comprises bar code data.

32. The method for managing quality information of a component according to claim 20, wherein, in said checking step, the stored quality information of the ordered component is compared with the data maintained in a matched relationship.

* * * * *

UNITED STATES PATENT AND TRADEMARK OFFICE
CERTIFICATE OF CORRECTION

PATENT NO. : 6,336,078 B1
DATED : January 1, 2002
INVENTOR(S) : Masahiko Sakayori et al.

It is certified that error appears in the above-identified patent and that said Letters Patent is hereby corrected as shown below:

Column 14,
Line 2, "inform" should read -- informing --.

Column 16,
Line 9, "component by checking data maintained in a matched" should read
-- component input by said inputting step with that of said ordered component which is changed and stored in said storage means; and --; and Line 10, "relationship with the delivered component; and" should be deleted.

Signed and Sealed this

Seventh Day of May, 2002

Attest:

Attesting Officer

JAMES E. ROGAN
Director of the United States Patent and Trademark Office